US008865319B2

(12) United States Patent
Maeda

(10) Patent No.: US 8,865,319 B2
(45) Date of Patent: Oct. 21, 2014

(54) REFLOW SN PLATED MATERIAL

(75) Inventor: Naofumi Maeda, Kanagawa (JP)

(73) Assignee: JX Nippon Mining & Metals Corporation, Tokyo (JP)

( * ) Notice: Subject to any disclaimer, the term of this patent is extended or adjusted under 35 U.S.C. 154(b) by 371 days.

(21) Appl. No.: 13/512,486

(22) PCT Filed: Oct. 26, 2010

(86) PCT No.: PCT/JP2010/068901
§ 371 (c)(1),
(2), (4) Date: Jul. 31, 2012

(87) PCT Pub. No.: WO2011/065166
PCT Pub. Date: Jun. 3, 2011

(65) Prior Publication Data

US 2012/0282486 A1 Nov. 8, 2012

(30) Foreign Application Priority Data

Nov. 30, 2009 (JP) ................................ 2009-271472

(51) Int. Cl.

| | |
|---|---|
| ***H01R 13/03*** | (2006.01) |
| ***C25D 5/50*** | (2006.01) |
| ***B32B 15/01*** | (2006.01) |
| ***B32B 15/20*** | (2006.01) |
| ***C25D 5/10*** | (2006.01) |
| ***C25D 5/12*** | (2006.01) |
| *C25D 3/38* | (2006.01) |

(52) U.S. Cl.
CPC ................ *C25D 5/505* (2013.01); *H01R 13/03* (2013.01); *C25D 5/10* (2013.01); *C25D 5/12* (2013.01); *C25D 3/38* (2013.01); *Y10S 428/929* (2013.01)
USPC ........... 428/647; 428/648; 428/675; 428/929; 439/886; 439/887; 205/226

(58) Field of Classification Search
None
See application file for complete search history.

(56) References Cited

U.S. PATENT DOCUMENTS

| | | | | |
|---|---|---|---|---|
| 2003/0178107 A1* | 9/2003 | Baukloh et al. | ............... | 148/519 |
| 2003/0201188 A1 | 10/2003 | Schetty, III et al. | | |
| 2004/0209112 A1 | 10/2004 | Hara et al. | | |
| 2006/0090819 A1* | 5/2006 | Egli | ............................. | 148/400 |
| 2006/0216475 A1* | 9/2006 | Miyazawa et al. | ............ | 428/141 |
| 2009/0108420 A1* | 4/2009 | Okura et al. | .................. | 257/666 |
| 2011/0111253 A1* | 5/2011 | Shibata et al. | ................ | 428/647 |
| 2011/0268920 A1* | 11/2011 | Miyazawa et al. | ............ | 428/143 |

FOREIGN PATENT DOCUMENTS

| | | |
|---|---|---|
| JP | 2002-266095 | 9/2002 |
| JP | 2003-293187 | 10/2003 |
| JP | 2006265642 | 10/2006 |
| JP | 2007063624 | 3/2007 |
| JP | 2008-274316 | 11/2008 |
| WO | WO2007/142352 | 12/2007 |
| WO | WO2010/001208 | 1/2010 |
| WO | WO2011/065166 | 6/2011 |

OTHER PUBLICATIONS

Notification of Transmittal of Copies of Translation of the International Preliminary Report on Patentability (Chaper I or Chapter II of the Patent Cooperation Treaty) corresponding to International Patent Application No. PCT/JP2010/068901 dated Jul. 19, 2012.
International Search Report corresponding to International Patent Application No. PCT/JP2010/068901dated Nov. 30, 2010.
Elgi et al., "New Approaches to Whisker Free Tin Deposits," Electronics Packaging Technology. 2003 5$^{th}$ Conference (EPTC 2003) pp. 55-58 (2003).
Narayanan et al., "Fretting corrosion of lubricated tin plated copper alloy contacts: Effect of temperature," Tribiology International. vol. 41 pp. 87-102 (2008).
Supplementary European Search Report corresponding to European Patent Application No. 10 833 013.5-1359 dated Jul. 11, 2013.

* cited by examiner

*Primary Examiner* — John J Zimmerman
(74) *Attorney, Agent, or Firm* — Jenkins, Wilson, Taylor & Hunt, P.A.

(57) ABSTRACT

A reflow Sn plated material, comprising: a substrate consisting of Cu or a Cu base alloy, and a reflow Sn layer formed on the surface of the substrate, wherein an orientation index of a (101) plane on the surface of the reflow Sn layer is from 2.0 or more to 5.0 or less.

4 Claims, No Drawings

REFLOW SN PLATED MATERIAL

FIELD OF THE INVENTION

The present invention relates to a reflow Sn plated material comprising a Cu or Cu base alloy substrate and a reflow Sn layer formed thereon, which is favorably used for a conductive spring material such as a connector, a terminal, a relay, a switch and the like.

DESCRIPTION OF THE RELATED ART

A plated copper alloy is used for conductive parts such as a connector, a terminal, a relay and the like. In particular, a Sn plated copper alloy is often used for automobile connectors. As to connectors for automobile, there is a trend toward multipolarity due to an increase in electric components. For this reason, when the connector is inserted, insertion and extraction force becomes increased. Generally, the connector is fitted by hands, which may unfavorably increase workload.

On the other hand, the Sn plated material requires that no whisker is produced, and solderability and contact resistance do not increased under high temperature environment. In particular, it is reported that solderability and contact resistance are deteriorated by a long-term storage of the plated materials in hot and humid in overseas along with overseas transfer of the factories of the connector manufacturers, and by a heating in a soldering furnace to perform soldering. In addition, when the Sn plated material is exposed to high temperature in an automobile engine room and the like, copper may be diffused to the Sn plated layer from a copper substrate, or the Sn plated layer may be oxidized, resulting in decreased contact resistance.

In view of the above, A Sn plated material is disclosed that a whisker production is inhibited on a Sn plated layer by controlling an orientation index of a (321) plane within the range from 2.5 to 4.0 (Patent Literature 1). And a reflow Sn plated material is disclosed having a Ni layer between a Sn plated layer and a copper substrate in order not to diffuse copper from the copper substrate even if the Sn plated material is exposed to high temperature (Patent Literature 2). Further, a reflow Sn plated material is disclosed having good insertion and extraction properties and a heat resistance property by controlling average roughness of a Cu—Sn alloy phase, which appears when the Sn plated layer is removed, to 0.05 to 0.3 μm (Patent Literature 3). And a Sn plated material is disclosed having improved press stamping and whisker resistance properties by controlling an orientation index of a (101) plane of the Sn plated layer, which is not reflowed, to 2.0 or less.

PRIOR ART DOCUMENTS

Patent Literature

[Patent Literature 1] Japanese Unexamined Patent Publication (Kokai) 2008-274316

[Patent Literature 2] Japanese Unexamined Patent Publication (Kokai) 2003-293187

[Patent Literature 3] Japanese Unexamined Patent Publication (Kokai) 2007-63624

[Patent Literature 4] Japanese Patent No. 3986265

PROBLEMS TO BE SOLVED BY THE INVENTION

In order to inhibit the whisker production, the Sn plated layer on the surface of the substrate is preferably reflowed. In light of the fact, the technology disclosed in Patent Literature 4 may not have an excellent whisker resistance property under harsh environments.

In order to decrease the insertion and extraction force when the connector is fitted, it is known that the Sn plated layer is made to be thin. However, decreasing the Sn plated thickness may result in poor solderability after heating. Thus, there is a limit to decrease the insertion and extraction force by decreasing the Sn plated thickness. A new technology for decreasing the insertion and extraction force is needed.

The present invention has been made to solve the above-mentioned problems. An object of the present invention is to provide a reflow Sn plated material where the whisker production is inhibited and the insertion and extraction force is decreased.

SUMMARY OF THE INVENTION

Through diligent studies by the present inventors, the insertion and extraction force can be decreased by controlling a surface orientation of a reflow Sn layer formed on a surface of a substrate.

That is, the present invention provides a reflow Sn plated material, comprising: a substrate consisting of Cu or a Cu base alloy, and a reflow Sn layer formed on the surface of the substrate, wherein an orientation index of a (101) plane on the surface of the reflow Sn layer is from 2.0 or more to 5.0 or less.

Preferably, the reflow Sn layer is formed by forming a Cu plated layer on the surface of the substrate, and reflowing a Sn plated layer formed on the surface of the Cu plated layer.

Preferably, a Ni layer is formed between the reflow Sn layer and the substrate.

According to the present invention, there is provided a reflow Sn plated material where the whisker production is inhibited and the insertion and extraction force is decreased.

DESCRIPTION OF THE EMBODIMENTS

Embodiments of the present invention will be described below. The symbol "%" herein refers to % by mass, unless otherwise specified.

The reflow Sn plated material according to the embodiment of the present invention comprises a substrate consisting of Cu or a Cu base alloy, and a reflow Sn layer formed on the surface of the substrate, wherein an orientation index of a (101) plane on the surface of the reflow Sn layer is from 2.0 or more to 5.0 or less.

Examples of the Cu or the Cu base alloy are the followings:

(1) Cu—Ni—Si type alloy

Cu—Ni—Si type alloy is, for example, C70250 (CDA number, the same shall apply hereinafter; Cu-3% Ni-0.5% Si-0.1 Mg) and C64745 (Cu-1.6% Ni-0.4% Si-0.5% Sn-0.4% Zn).

(2) Brass

Brass is, for example, C26000 (Cu-30% Zn) and C26800 (Cu-35% Zn).

(3) Red Brass

Red brass is, for example, C21000, C22000 and C23000.

(4) Titanium Copper

Titanium copper is, for example, C19900 (Cu-3% Ti).

(5) Phosphor Bronze

Phosphor bronze is, for example, C51020, C51910, C52100 and C52400.

The reflow Sn layer can be provided by plating Sn on the surface of the substrate, and reflowing it. By reflowing, Cu in the substrate is diffused to the surface. The layer structure is configured in the following order: a Sn layer, a Cu—Sn alloy layer and a substrate from the surface of the reflow Sn layer. As the reflow Sn layer, a Sn alloy such as Sn—Cu, Sn—Ag, Sn—Pb and the like can be used as well as Sn alone. In addition, a Cu underlayer and/or a Ni underlayer may be disposed between the Sn layer and the substrate.

With the orientation index of the (101) plane on the surface of the reflow Sn layer being from 2.0 or more to 5.0 or less, the insertion and extraction properties can be improved when it is used for a connector and the like. If the orientation index of the (101) plane on the surface of the reflow Sn layer is less than 2.0, the desirable insertion and extraction properties cannot be provided. If the orientation index of the (101) plane on the surface of the reflow Sn layer exceeds 5.0, the insertion and extraction properties may be good, but solderability may be deteriorated after heating.

Although the reason why the insertion and extraction properties can be improved by controlling the orientation index of the (101) plane on the surface of the reflow Sn layer is not unclear, it can be considered as follows: A slip system of a Sn phase has 5 sets of {110}[001], {100}[001], {111}[101], {101}[101] and {121}[101]. The {101} plane becomes a slip plane of Sn. Accordingly, increasing the orientation index of the {101} plane (to 2.0 or more) may increase the percentage of the slip plane in parallel with the surface of the reflow Sn layer. Thus, when shear stress is applied on the Sn plated surface upon fitting of the connector, the plated surface may be deformed by a relatively low stress.

In order to control the orientation index of the (101) plane on the surface of the reflow Sn layer within the abovementioned range, it is required to change the orientation of the surface of the substrate and to reflow under adequate conditions. The orientation index of the (101) plane on the surface of the substrate is about 1.5. If a substrate like this is Sn plated and reflowed, it cannot control the orientation index of the (101) plane on the surface of the reflow Sn layer to 2.0 or more.

Thus, a Cu plated layer having the (101) plane oriented preferentially is formed on the surface of the substrate, and the surface of the Cu plated layer is Sn plated. Thereafter, a reflow process is conducted at a temperature of 450 to 600° C. in a reflow furnace and at a reflow time of 8 to 20 seconds. As a result, the desired contact resistance and solderability can be satisfied, and the orientation index of the (101) plane on the surface of the reflow Sn layer can be 2.0 or more.

The Cu layer plating formed by electroplating may be consumed when a Cu—Sn alloy layer is formed upon reflowing, and may have zero thickness. However, if the thickness of the Cu plated layer exceeds 1.0 μm before reflowing, the Cu—Sn alloy layer may be thickened after reflowing, so that an increase in the contact resistance upon heating and deterioration of the solderability may be significant, and the heat resistance may be decreased. This may because Cu exists as electrodeposited grains in the Cu electroplated layer and is easily diffused to the surface by heat as compared with Cu in the substrate, which is a rolled material.

If the reflow temperature is less than 450° C., or if the reflow time is less than 8 seconds, the takeover of the orientation to the plated layer is insufficient, so that the orientation index of the (101) plane is less than 2.0 and the desired insertion and extraction properties cannot be provided. If the reflow temperature exceeds 600° C., or if the reflow time exceeds 20 seconds, the orientation index of the (101) plane exceeds 5.0, so that the insertion and extraction properties may be good, but solderability after heating may be deteriorated.

In order to control the orientation of the Cu plated layer and to increase the orientation index of the (101) plane larger than that of the substrate, Cu may be plated by adding colloidal silica and/or halide ions to a Cu plating bath. As the halide ions, chloride ions are preferably used. The concentration of the chloride ions can be controlled, for example, by adding potassium chloride to the plating bath. So long as the compound is ionized in chloride ions in the plating bath, it is not limited to a potassium salt. As the Cu plating bath, a copper sulfate bath can be used. The orientation of the Cu plated layer can be controlled as follows: When the bath contains only colloidal silica, 10 mL/L (which represents colloidal silica volume containing 20 wt % of silica at specific gravity: 1.12 $g/m^2$, silica particle size: 10 to 20 nm) or more of colloidal silica is added. When the bath contains only the chloride ions, 25 mg/L or more of the chloride ions is added. Colloidal silica and halide ions may be co-added.

The above-described plated structure may be provided by limiting the thickness of the Cu plating having the (101) plane oriented preferentially within the range from 0.2 μm or more to less than 1.0 μm, plating Sn thereon in a thickness of 0.7 to 2.0 μm, and conducting the reflow process at a reflow temperature of 450 to 600° C. and a reflow time of 8 to 20 seconds.

The average thickness of the reflow Sn layer (layer of metal Sn) is preferably 0.2 to 1.8 μm. If the thickness of the reflow Sn layer is less than 0.2 μm, solderability may be decreased. If the thickness of the reflow Sn layer exceeds 1.8 μm, the insertion force may be increased.

The thickness of the Cu—Sn alloy layer formed between the reflow Sn layer and the substrate is preferably 0.5 to 1.9 μm. Because the Cu—Sn alloy layer is hard, once the thickness of the Cu—Sn alloy layer exceeds 0.5 μm, the insertion force may be decreased. On the other hand, if the thickness of the Cu—Sn alloy layer exceeds 1.9 μm, an increase in the contact resistance and deterioration of the solderability may be significant, and the heat resistance may be decreased.

A Ni layer may be formed between the reflow Sn layer and the substrate. The Ni layer can be provided by plating Ni, Cu and Sn in this order on the surface of the substrate, and then conducting the reflow process. By reflowing, Cu in the substrate is diffused to the surface, and the layer structure is configured in the following order: a Sn layer, a Cu—Sn alloy layer, a Ni layer and a substrate from the surface of the reflow Sn layer. The Ni layer prevents the Cu diffusion from the substrate, so that the Cu—Sn alloy layer is not thickened. Cu plating is conducted to provide 2.0 or more of the orientation index of the (101) plane on the surface of the reflow Sn layer.

The thickness of the Ni layer after reflowing is preferably 0.1 to 0.5 μm. If the thickness of the Ni layer is less than 0.1 μm, corrosion resistance and heat resistance may be decreased. On the other hand, if the thickness of the Ni layer after reflowing exceeds 0.5 μm, the heat resistance may not be improved anymore and the costs may be increased. The upper limit of the Ni layer is preferably 0.5 μm.

The present invention will be described in detail by following embodiments, but is not limited thereto.

Embodiment 1

On one surface of the substrate (a Cu-1.6% Ni-0.4% Si alloy having a thickness of 0.3 mm), Cu and Sn were electroplated in thicknesses of 0.5 μm and 1.0 μm, respectively. Thereafter, a reflow process was conducted under the conditions shown in Table 1 to provide a reflow Sn plated material.

As a Cu plating bath, a copper sulfate bath containing 60 g/L of sulfuric acid and 200 g/L of copper sulfate was used at a bath temperature of 50° C. Colloidal silica ("Snowtex O" manufactured by Nissan Chemical Industries, Ltd., specific gravity: 1.12, a silica content of 20 wt %, a silica particle size of 10 to 20 nm) and/or chloride ions (potassium chloride) were added at a percentage shown in Table 1. A current density when Cu was plated was 5 A/dm$^2$. Plating was conducted by agitating the plating bath with an impeller at 200 rpm (revolutions per minute).

As an Sn plating bath, a bath containing 80 g/L of methanesulfonic acid, 250 g/L of tin methanesulfonate and 5 g/L of a nonionic surfactant was used at a bath temperature of 50° C. A current density when Sn was plated was 8 A/dm$^2$. Plating was conducted by agitating the plating bath with an impeller at 200 rpm (revolutions per minute).

<Evaluation>

1. Measurement of Orientation Index

The resultant reflow Sn plated member was cut out to a test piece having a width of 20 mm and a length of 20 mm. The orientation of the surface of the reflow Sn layer was measured under standard conditions (θ-2θ scan) by an X-ray diffractometer. As a radiation source, CuKα was used. Measurement was conducted at a tube current of 100 mA and a tube voltage of 30 kV. The orientation index K was calculated by the following equation:

$$K=\{A/B\}/\{C/D\}$$

where

A: a peak intensity of the (101) plane (cps),

B: a sum of peak intensities of the orientation planes of interest ((200), (101), (220), (211), (301), (112), (400), (321), (420), (411), (312), (431), (103), (332))(cps), C: an intensity of the (101) plane by a standard data in X-ray diffraction (powder method), and D: a sum of intensities of the orientation planes (planes defined in B) by a standard data in X-ray diffraction (powder method).

2. Evaluation of Heat Resistance

For heat resistance evaluation, the resultant reflow Sn plated material was heated at 145° C. for 500 hours. Thereafter, contact resistance on the surface of the reflow Sn layer was measured. The contact resistance was measured using an electric contact simulator CRS-113-Au type manufactured by Yamazaki Seiki Co., Ltd. by a four terminal method at a voltage of 200 mV, a current of 10 mA, a sliding load of 0.49 N, a sliding speed of 1 mm/min and a sliding distance of 1 mm.

3. Evaluation of Insertion and Extraction Properties

The insertion and extraction properties were evaluated by the coefficient of kinetic friction of the surface of the reflow Sn layer in the resultant reflow Sn plated material. First, a sample was fixed onto a sampling stage. A stainless ball having a diameter of 7 mm was pushed onto the substrate side of the sample so that the surface of the reflow Sn layer was expanded hemispherically. The expanded surface of the reflow Sn layer was a "female" side. Then, the same sample onto which the stainless ball was not pushed was mounted on a movable stage so that the surface of the reflow Sn layer was exposed. The surface was a "male" side.

The expanded "female" side was placed on the "male" side of the reflow Sn layer. Both sides were contacted. In this condition, while a predetermined load W (=4.9N) was applied to a rear side (substrate side) of the expanded side, the movable stage was moved in a horizontal direction. A resistant load F in the movement to the horizontal direction was measured using a load cell. A sliding speed of the sample (a horizontal movement speed of the movable stage) was 50 mm/min. A sliding direction was parallel to a rolled direction of the sample. A sliding distance was 100 mm. An average value of F was determined over the sliding distance. The coefficient of kinetic friction μ was calculated by μ=F/W.

4. Evaluation of Solderability

Pursuant to the soldering test method (balance method) of JIS-C60068, the solderability of the resultant reflow Sn plated material with lead-free solder was evaluated. The Sn plated material was a strip specimen having a width of 10 mm×a length of 50 mm. The test was conducted using a SAT-20 solder checker manufactured by Rhesca Corporation under the following conditions. A load/time curve was obtained to determine zero cross time. When the zero cross time was 6 seconds or less, the solderability was determined as "good". When the zero cross time exceeded 6 seconds, the solderability was determined as "not good".

(Flux Application)

A Flux was applied to the specimen as follows; Flux: 25% rosin-ethanol, Flux temperature: room temperature, Flux immersion depth: 20 mm, Flux immersion time: 5 seconds. The flux was drained off with filter paper with which an edge was contacted for 5 seconds to remove the flux, which was conducted by fixing it to the apparatus and keeping it for 30 seconds.

(Soldering)

Soldering was conducted as follows; Solder composition: Sn-3.0% Ag-0.5% Cu (manufactured by Senju Metal Industries, Co., Ltd.), Solder temperature: 250° C., Solder immersion speed: 4 mm/s, Solder immersion depth: 2 mm, Solder immersion time: 10 seconds.

Embodiment 2

On one surface of the substrate Ni was electroplated in thicknesses of 0.3 μm. As in Embodiment 1, Cu and Sn were further electroplated in thicknesses of 0.5 μm and 1.0 μm, respectively. Thereafter, a reflow process was conducted under the conditions shown in Table 2 to provide a reflow Sn plated material.

As a Ni plating bath, a bath containing 250 g/L of nickel sulfate, 45 g/L of nickel chloride and 30 g/L of boric acid was used at a bath temperature of 50° C.

A current density when Ni was plated was 5 A/dm$^2$. Plating was conducted by agitating the plating bath with an impeller at 200 rpm.

Embodiment 3

Ni, Cu and Sn were electroplated, respectively, as in Embodiments 1 and 2, except that the thicknesses of Ni, Cu and Sn were changed shown in Table 3. Thereafter, a reflow process was conducted under the conditions of 550° C.×15 seconds to provide a reflow Sn plated material. As a Cu plating bath, a copper sulfate bath containing 60 g/L of sulfuric acid and 200 g/L of copper sulfate was used at a bath temperature of 50° C. 15 mL/L (which represents colloidal silica volume containing 20 wt % of silica at specific gravity: 1.12 g/m$^2$, silica particle size: 10 to 20 nm) of Colloidal silica ("Snowtex O" manufactured by Nissan Chemical Industries, Ltd.,) and 25 mg/L of chloride ions (potassium chloride) were added. A current density when Cu was plated was 5 A/dm$^2$. Plating was conducted by agitating the plating bath with an impeller at 200 rpm.

The results obtained are shown in Tables 1 to 3.

In Table 1, Examples 1 to 7 and Comparative Examples 8 to 14 are the results according to Embodiment 1. In Table 2, Examples 20 to 23 and Comparative Examples 30 to 35 are the results according to Embodiment 2. In Table 3, Examples 40 to 49 and Comparative Examples 50 to 54 are the results according to Embodiment 3.

TABLE 1

| | No. | Addutives in Cu plating bath: Colloidal silica (mL/L) | Addutives in Cu plating bath: Chloride ion (mg/L) | Reflow conditions: Temperature (° C.) | Reflow conditions: Time (sec) | Reflow Sn layer: Thickness (μm) | Reflow Sn layer: Orientation index of (101)plane | Coefficient of kinetic friction | Contact resistance/ mΩ | Solderability | Overall evaluation |
|---|---|---|---|---|---|---|---|---|---|---|---|
| Example | No. 1 | 15 | 0 | 450 | 8 | 0.58 | 2.2 | 0.45 | 0.78 | Good | Good |
| | No. 2 | 20 | 0 | 500 | 8 | 0.54 | 2.4 | 0.49 | 0.79 | Good | Good |
| | No. 3 | 0 | 25 | 500 | 10 | 0.53 | 2.1 | 0.45 | 0.82 | Good | Good |
| | No. 4 | 0 | 50 | 500 | 13 | 0.51 | 2.8 | 0.40 | 0.85 | Good | Good |
| | No. 5 | 15 | 25 | 550 | 10 | 0.46 | 3.4 | 0.36 | 0.85 | Good | Good |
| | No. 6 | 20 | 50 | 550 | 12 | 0.45 | 3.8 | 0.41 | 0.87 | Good | Good |
| | No. 7 | 30 | 60 | 600 | 10 | 0.4 | 4.2 | 0.39 | 0.91 | Good | Good |
| Comparative Example | No. 8 | 5 | 0 | 500 | 10 | 0.55 | 1.2 | 0.55 | 0.83 | Good | Not good |
| | No. 9 | 0 | 15 | 500 | 10 | 0.52 | 1.3 | 0.53 | 0.86 | Good | Not good |
| | No. 10 | 15 | 25 | 500 | 5 | 0.53 | 1.0 | 0.55 | 0.72 | Good | Not good |
| | No. 11 | 15 | 25 | 500 | 20 | 0.47 | 3.2 | 0.30 | 1.15 | Not good | Not good |
| | No. 12 | 15 | 25 | 400 | 10 | 0.66 | 1.2 | 0.55 | 0.75 | Good | Not good |
| | No. 13 | 15 | 25 | 650 | 10 | 0.31 | 5.7 | 0.27 | 1.25 | Not good | Not good |
| | No. 14 | 15 | 25 | 400 | 5 | 0.63 | 0.6 | 0.60 | 0.71 | Good | Not good |

TABLE 2

| | No. | Addutives in Cu plating bath: Colloidal silica (mL/L) | Addutives in Cu plating bath: Chloride ion (mg/L) | Reflow conditions: Temperature (° C.) | Reflow conditions: Time (sec) | Reflow Sn layer: Thickness (μm) | Reflow Sn layer: Orientation index of (101)plane | Coefficient of kinetic friction | Contact resistance/ mΩ | Solderability | Overall evaluation |
|---|---|---|---|---|---|---|---|---|---|---|---|
| Example | No. 20 | 20 | 0 | 500 | 8 | 0.55 | 2.2 | 0.47 | 0.72 | Good | Good |
| | No. 21 | 0 | 50 | 500 | 13 | 0.56 | 3.0 | 0.39 | 0.81 | Good | Good |
| | No. 22 | 15 | 25 | 550 | 10 | 0.51 | 3.2 | 0.33 | 0.78 | Good | Good |
| | No. 23 | 30 | 60 | 600 | 10 | 0.45 | 3.9 | 0.39 | 0.83 | Good | Good |
| Comparative Example | No. 30 | 5 | 0 | 500 | 10 | 0.55 | 1.0 | 0.56 | 0.79 | Good | Not good |
| | No. 31 | 0 | 15 | 500 | 10 | 0.53 | 1.1 | 0.57 | 0.81 | Good | Not good |
| | No. 32 | 15 | 25 | 500 | 5 | 0.56 | 0.9 | 0.53 | 0.64 | Good | Not good |
| | No. 33 | 15 | 25 | 500 | 20 | 0.49 | 5.1 | 0.29 | 1.11 | Not good | Not good |
| | No. 34 | 15 | 25 | 400 | 10 | 0.66 | 1.1 | 0.58 | 0.71 | Good | Not good |
| | No. 35 | 15 | 25 | 650 | 10 | 0.42 | 5.9 | 0.27 | 1.21 | Not good | Not good |

TABLE 3

| | No. | Plated thickness before reflowing (μm): Cu plated layer | Plated thickness before reflowing (μm): Sn plated layer | Plated thickness before reflowing (μm): Ni plated layer | Reflow Sn layer: Thickness (μm) | Reflow Sn layer: Orientation index of (101)plane | Coefficient of kinetic friction | Contact resistance/ mΩ | Solderability | Overall evalution |
|---|---|---|---|---|---|---|---|---|---|---|
| Example | No. 40 | 0.3 | 0.8 | 0 | 0.46 | 3.0 | 0.33 | 0.83 | Good | Good |
| | No. 41 | 0.35 | 1.2 | 0 | 0.83 | 2.3 | 0.39 | 0.81 | Good | Good |
| | No. 42 | 0.5 | 1.0 | 0 | 0.51 | 3.1 | 0.34 | 0.88 | Good | Good |
| | No. 43 | 0.5 | 1.2 | 0 | 0.73 | 2.5 | 0.45 | 0.83 | Good | Good |
| | No. 44 | 0.6 | 1.3 | 0 | 0.75 | 2.7 | 0.46 | 0.88 | Good | Good |
| | No. 45 | 0.65 | 1.8 | 0 | 1.22 | 2.1 | 0.48 | 0.75 | Good | Good |
| | No. 46 | 0.3 | 0.8 | 0.1 | 0.44 | 2.9 | 0.35 | 0.84 | Good | Good |
| | No. 47 | 0.3 | 0.8 | 0.3 | 0.45 | 3.1 | 0.32 | 0.82 | Good | Good |
| | No. 48 | 0.3 | 0.8 | 0.5 | 0.43 | 3.1 | 0.33 | 0.79 | Good | Good |
| | No. 49 | 0.5 | 1.0 | 0.5 | 0.52 | 2.8 | 0.34 | 0.91 | Good | Good |
| Comparative Example | No. 50 | 0 | 0.8 | 0 | 0.7 | 0.9 | 0.62 | 0.79 | Good | Not good |
| | No. 51 | 0.1 | 0.8 | 0 | 0.66 | 1.1 | 0.59 | 0.81 | Good | Not good |
| | No. 52 | 1.0 | 1.5 | 0 | 0.62 | 3.3 | 0.3 | 1.03 | Not good | Not good |
| | No. 53 | 0.5 | 0.3 | 0 | 0 | 3.7 | 0.33 | 1.28 | Not good | Not good |
| | No. 54 | 0.5 | 2.3 | 0 | 0 | 1.1 | 0.61 | 0.71 | Good | Not good |

As apparent from Table 1, in each of Examples 1 to 7 according to the scope of the present invention, the coefficient of kinetic friction was 0.5 or less, the contact resistance was 0.95 mΩ or less, and solderability was good.

On the other hand, in each of Comparative Example 8 where the content of colloidal silica in the Cu plating bath was less than 10 mL/L and Comparative Example 9 where the content of the chloride ions in the Cu plating bath was less than 25 mg/L, the orientation index of the (101) plane on the surface of the reflow Sn layer was less than 2.0, and the coefficient of kinetic friction exceeded 0.5.

In each of Comparative Example 10 where the reflow time was less than 8 seconds, and Comparative Examples 12 and 14 where the reflow temperature was less than 450° C., the reflow process was insufficient, the orientation index of the (101) plane on the surface of the reflow Sn layer was less than 2.0, and the coefficient of kinetic friction exceeded 0.5. This may because the Sn plated layer was not sufficiently molten and the Sn layer was hard to be re-oriented.

In each of Comparative Example 11 where the reflow time exceeded 20 seconds, and Comparative Example 13 where the reflow temperature exceeded 600° C., the reflow process was excessive, the contact resistance exceeded 0.95 mΩ, and the solderability was not good. This may because Cu was diffused from the underlayer to the reflow Sn layer by the excessive reflow process, and the amount of metal Sn remaining on the surface was decreased by oxidation of the Sn layer.

As apparent from Table 2, in each of Example 20 to 23 according to the scope of the present invention, the coefficient of kinetic friction was 0.5 or less, the contact resistance was 0.95 mΩ or less, and the solderability was good.

On the other hand, in each of Comparative Examples 30 where the content of colloidal silica in the Cu plating bath was less than 10 mL/L and Comparative Example 31 where the content of the chloride ions in the Cu plating bath was less than 25 mg/L, the orientation index of the (101) plane on the surface of the reflow Sn layer was less than 2.0, and the coefficient of kinetic friction exceeded 0.5.

In each of Comparative Example 32 where the reflow time was less than 8 seconds, and Comparative Example 34 where the reflow temperature was less than 450° C., the reflow process was insufficient, the orientation index of the (101) plane on the surface of the reflow Sn layer was less than 2.0, and the coefficient of kinetic friction exceeded 0.5.

In each of Comparative Example 33 where the reflow time exceeded 20 seconds, and Comparative Example 35 where the reflow temperature exceeded 600° C., the reflow process was excessive, the contact resistance exceeded 0.95 mΩ, and the solderability was not good.

As apparent from Table 3, in each of Example 40 to 49 according to the scope of the present invention, the coefficient of kinetic friction was 0.5 or less, the contact resistance was 0.95 mΩ or less, and the solderability was good.

On the other hand, in each of Comparative Examples 50 where Sn was plated directly on the surface without plating Cu, and Comparative Example 51 where the thickness of the Cu plated layer was less than 0.2 μm upon Cu plating (before reflowing), the orientation index of the (101) plane on the surface of the reflow Sn layer was less than 2.0, and the coefficient of kinetic friction exceeded 0.5. This may because there was no (or a thin) Cu plated layer, which was the underlayer of the Sn layer that was molten upon reflowing, so that the orientation of the substrate had strong impact and the Sn layer was hard to be re-oriented.

In Comparative Example 52 where the thickness of the Cu plated layer was 1.0 μm or more upon Cu plating (before reflowing), the contact resistance exceeded 0.95 mΩ, and the solderability was not good. This may because Cu existed as electrodeposited grains in the Cu electroplated layer and was easily diffused to the surface by heat as compared with Cu in the substrate, which was a rolled material, and the thickness of the Cu—Sn alloy layer after reflowing was increased.

In Comparative Example 53 where the thickness of the Sn plated layer was less than 0.7 μm upon Sn plating (before reflowing), the contact resistance exceeded 0.95 mΩ, and the solderability was not good. This may because the thickness of the Sn plated layer was thin, so that the amount of metal Sn remaining on the surface was decreased by diffusion of Cu by reflowing and oxidation of the Sn layer.

In Comparative Example 54 where the thickness of the Sn plated layer exceeded 2.0 μm upon Sn plating (before reflowing), the orientation index of the (101) plane on the surface of the reflow Sn layer was less than 2.0, and the coefficient of kinetic friction exceeded 0.5. This may because the thickness of the Sn plated layer was thick, so that friction on the surface was increased by soft Sn.

What is claimed is:

1. A reflow Sn plated material, comprising:

a substrate consisting of Cu or a Cu base alloy, and a reflow Sn layer formed on the surface of the substrate, wherein an orientation index of a (101) plane on the surface of the reflow Sn layer is from 2.0 or more to 5.0 or less.

2. The reflow Sn plated material according to claim 1, wherein the reflow Sn layer is formed by forming a Cu plated layer on the surface of the substrate, and reflowing an Sn plated layer formed on the surface of the Cu plated layer.

3. The reflow Sn plated material according to claim 1, wherein a Ni layer is formed between the reflow Sn layer and the substrate.

4. The reflow Sn plated material according to claim 2, wherein a Ni layer is formed between the reflow Sn layer and the substrate.

* * * * *